United States Patent
Xiong et al.

(10) Patent No.: US 12,423,981 B2
(45) Date of Patent: Sep. 23, 2025

(54) STORAGE AND PROCESSING OF INTERMEDIATE FEATURES IN NEURAL NETWORKS

(71) Applicant: Western Digital Technologies, Inc., San Jose, CA (US)

(72) Inventors: Shaomin Xiong, Fremont, CA (US); Toshiki Hirano, San Jose, CA (US); Ramy Ayad, San Jose, CA (US); Damien Kah, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 220 days.

(21) Appl. No.: 17/363,490

(22) Filed: Jun. 30, 2021

(65) Prior Publication Data
US 2023/0004742 A1    Jan. 5, 2023

(51) Int. Cl.
*G06V 20/52* (2022.01)
*G06N 3/045* (2023.01)
(Continued)

(52) U.S. Cl.
CPC ............ *G06V 20/52* (2022.01); *G06N 3/045* (2023.01); *G06T 7/246* (2017.01); *G06T 7/292* (2017.01);
(Continued)

(58) Field of Classification Search
CPC .... G06N 3/045; G06V 20/52; G06V 2201/10; G06T 7/20; G06T 2207/20084; G06T 7/292; G06T 2207/30232
See application file for complete search history.

(56) References Cited

U.S. PATENT DOCUMENTS 10,628,683 B2 * 4/2020 Doumbouya .......... G06V 20/52
10,796,184 B2 10/2020 Senay et al.
(Continued)

FOREIGN PATENT DOCUMENTS

CN    111783984 A   * 10/2020

OTHER PUBLICATIONS

Kraus et. al, "Toward Mass Video Data Analysis: Interactive and Immersive 4D Scene Reconstruction," Sep. 2020, Sensors (Basel). Sep. 22, 2020, 20(18):5426 (Year: 2020).*
(Continued)

*Primary Examiner* — Emily C Terrell
*Assistant Examiner* — Julia Z. Yao
(74) *Attorney, Agent, or Firm* — Patent Law Works LLP

(57) ABSTRACT

Systems and methods described herein provide for the use and storage of intermediate layer data within a neural network processing system. A first neural network, such as an object detection neural network may receive and process raw video image data to generate output utilized for metadata creation. Secondary neural networks may be configured to accept input data from one or more intermediate layers of the first neural network instead of the raw video image data. In this way, the initial data processed by the intermediate layers of the first neural network can be stored and utilized as a shortcut for processing additional features or attributes within the video image data. This alleviates the need to process video image data multiple times in different neural networks. The intermediate layer data can be stored in a different and often cheaper storage system and recalled faster and with fewer resources for future use.

28 Claims, 9 Drawing Sheets

(51) Int. Cl.
　　*G06T 7/246*　　(2017.01)
　　*G06T 7/292*　　(2017.01)
　　*G06V 20/40*　　(2022.01)

(52) U.S. Cl.
　　CPC .... *G06V 20/41* (2022.01); *G06T 2207/20084* (2013.01); *G06T 2207/30232* (2013.01); *G06V 2201/10* (2022.01)

(56) References Cited

U.S. PATENT DOCUMENTS

| | | |
|---|---|---|
| 2019/0220734 A1 | 7/2019 | Ferdman et al. |
| 2019/0222756 A1* | 7/2019 | Moloney ................ G06V 10/82 |
| 2020/0219268 A1 | 7/2020 | Liu et al. |
| 2020/0285961 A1 | 9/2020 | Yoshinaga et al. |
| 2021/0064967 A1* | 3/2021 | Nosko ................... G06N 3/082 |
| 2021/0174197 A1* | 6/2021 | Georgis ................. H04L 65/75 |
| 2024/0153044 A1* | 5/2024 | Mihal ....................... G06T 5/50 |

OTHER PUBLICATIONS

Chen, Y. et al, "Memory Enhanced Global-Local Aggregation for Video Object Detection," 2020 IEEE/CVF Conference on Computer Vision and Pattern Recognition (CVPR), 2020, pp. 10334-10343, doi: 10.1109/CVPR42600.2020.01035.

Deng, H., "Object Guided External Memory Network for Video Object Detection," 2019 IEEE/CVF International Conference on Computer Vision (ICCV), 2019, pp. 6677-6686, doi: 10.1109/ICCV.2019.00678.

Murphy-Chutorian, E. et al, "Shared Features for Scalable Appearance-Based Object Recognition", IEEE 2005 Workshop on Applications of Computer Vision (WACV 2005) Breckenridge, CO. USA. Jan. 5-7, 2005.

Rios-Cabrera, R. et al., "Efficient multi-camera vehicle detection, tracking, and identification in a tunnel surveillance application", Computer Vision and Image Understanding 116 (2012) 742-753.

Wang, F. et al, "Deep Multi-Task Learning for Joint Prediction of Heterogeneous Face Attributes", 2017 IEEE 12th International Conference on Automatic Face & Gesture Recognition.

* cited by examiner

STORAGE AND PROCESSING OF INTERMEDIATE FEATURES IN NEURAL NETWORKS

FIELD

The present disclosure relates to neural network processing. More particularly, the present disclosure technically relates to various systems and methods to store and process intermediate feature data generated within neural networks, such as image and video data focused neural networks.

BACKGROUND

As technology has grown over the last decade, the quantity of time-series data such as video content has increased dramatically. This increase in time-series data has generated a greater demand for automatic classification. In response, neural networks and other artificial intelligence methods have been increasingly utilized to generate automatic classifications, specific detections, and segmentations. In the case of video processing, computer vision trends have progressively focused on object detection, image classification, and other segmentation tasks to parse semantic meaning from video content.

However, as time-series data and the neural networks used to analyze them have increased in size and complexity, a higher computational demand is created. More data to process requires more processing power to compile all the data. Likewise, more complex neural networks require more processing power to parse the data. Traditional methods of handling these problems include trading a decrease in output accuracy for increased processing speed, or conversely, increasing the output accuracy for a decrease in processing speed. The current state of the art suggests that increasing both output accuracy and speed is achieved through providing an increase in computational power.

Increasingly, there is a need for more efficient processing of video data at the edges (or end points) of networks where video content is created, where edge device prices are important (limiting processing power per cost point) and the energy consumed for increasing computation power can be a constrained resource. Further, the rising volume of video data makes transmitting the data to some distant location for computation and storage less and less practical. This is particularly true of video cameras used in surveillance applications, where it is highly desirable to process data internal to the camera itself before sending the results of the computations elsewhere. There is also a need to store data efficiently in an edge device since there may be a need to subsequently analyze the video data at a later time using different criteria.

SUMMARY

Systems and methods for storage and processing of intermediate features in neural networks in accordance with embodiments of the invention are disclosed. In many embodiments, a device includes a processor configured to process video data which includes storing received video data into a primary storage device type, and inputting the video data into a first artificial neural network. The first artificial neural network includes at least an input layer, one or more hidden layers, and an output layer, generating intermediate layer data by utilizing the outputs of one or more of the intermediate layers of the first artificial neural network. The intermediate layer data is stored into a second storage device type which is different from the first device type, is used as input data for one or more secondary artificial neural networks.

In various embodiments, the second storage device type is different from the first device type in an access speed of read or write operations.

In further embodiments, the device further includes (a) a first storage device of the first storage device type configured to store the received video data and (b) a second storage device of the second storage device type configured to store the intermediate layer In a variety of embodiments, the device further includes a storage device, the storage device comprising: (a) first media of the first storage device type, the first media configured to store the received video data and (b) second media of the second storage device type, the second media configured to store the intermediate layer.

In additional embodiments, the first artificial neural network is an object detection neural network.

In yet further embodiments, the object detection neural network is a convolutional neural network.

In still additional embodiments, the second storage device type is a fast-access storage device.

In more embodiments, the plurality of secondary artificial neural networks includes one or more attribute detection neural networks.

In yet more additional embodiments, the plurality of secondary artificial neural networks includes at least a tracking neural network.

In additional further embodiments, the plurality of secondary artificial neural networks includes at least a recognition neural network.

In still more embodiments, the intermediate layer data can be utilized as input data for a first and a second secondary artificial neural network of the secondary artificial neural networks.

In a variety of embodiments, the input data utilized from the intermediate layer data can be formatted as a tensor set of intermediate layer data generated from a selection of intermediate layer outputs from the first artificial neural network.

In more embodiments again, the first secondary artificial neural network utilizes a first tensor set of intermediate layer data and the second secondary artificial neural network utilizes a second tensor set of intermediate layer data.

In more further embodiments, the first tensor set of intermediate layer data is generated from a first group of intermediate hidden layer data outputs from the first artificial neural network, and the second tensor set of intermediate layer data is generated from a second group of intermediate hidden layer data outputs from the first artificial neural network.

In more additional embodiments, the output of the first and secondary artificial neural networks are utilized to generate a plurality of metadata associated with the video data.

In certain embodiments, a one of the secondary artificial neural networks is selected to generate new metadata after the plurality of metadata has been generated.

In some embodiments, the selected secondary artificial neural network utilizes intermediate hidden layer data stored within the second storage device type.

In a number of embodiments, method for reducing subsequent processing of video data, includes defining a target to search within a video data pool includes a plurality of video data sources and associated intermediate layer data for each video data source, determining at least one or more features associated with the defined target, searching for the target within the plurality of video data source intermediate layer data, locating the target within multiple video data sources, and determining a path for the defined target.

In still more various embodiments, the video data pool includes a plurality of security cameras.

In many additional embodiments, the intermediate layer data is generated by a primary artificial neural network and the searching of the target includes utilizing a plurality of secondary artificial neural networks.

In a variety of embodiments, a device includes a processor configured to process video data the processing includes inputting the video data into a primary artificial neural network the first artificial neural network includes at least an input layer, one or more hidden layers, and an output layer, generating intermediate layer data by utilizing the outputs of one or more of the intermediate layers of the first artificial neural network, storing the intermediate layer data, and utilizing the intermediate layer data as input data for a plurality of secondary artificial neural networks.

In particular embodiments, the intermediate layer data is utilized as input data for a first and a second secondary artificial neural networks of the secondary artificial neural networks.

In certain embodiments, the input data utilized from the intermediate layer data is formatted as a tensor set of intermediate layer data generated from a selection of intermediate layer outputs from the first artificial neural network.

In some further embodiments, the first secondary artificial neural network utilizes a first tensor set of intermediate layer data and the second secondary artificial neural network utilizes a second tensor set of intermediate layer data.

In a number of embodiments, the first tensor set of intermediate layer data is generated from a first group of intermediate hidden layer data outputs from the first artificial neural network and the second tensor set of intermediate layer data is generated from a second group of intermediate hidden layer data outputs from the first artificial neural network.

In yet more embodiments, the output of the first and secondary artificial neural networks are utilized to generate a plurality of metadata associated with the video data.

In further additional embodiments, one of the secondary artificial neural networks is selected to generate new metadata after the plurality of metadata has been generated.

In still more embodiments, the selected secondary artificial neural network utilizes intermediate hidden layer data stored.

In various additional embodiments, the first artificial neural network is an object detection neural network, and the secondary artificial neural networks comprise one or more of: an attribute detection neural network, a tracking neural network, and a recognition neural network.

Although the description above contains many specificities, these should not be construed as limiting the scope of the invention but as merely providing illustrations of some of the presently preferred embodiments of the invention. Various other embodiments are possible within its scope. Accordingly, the scope of the invention should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

Figure 1:
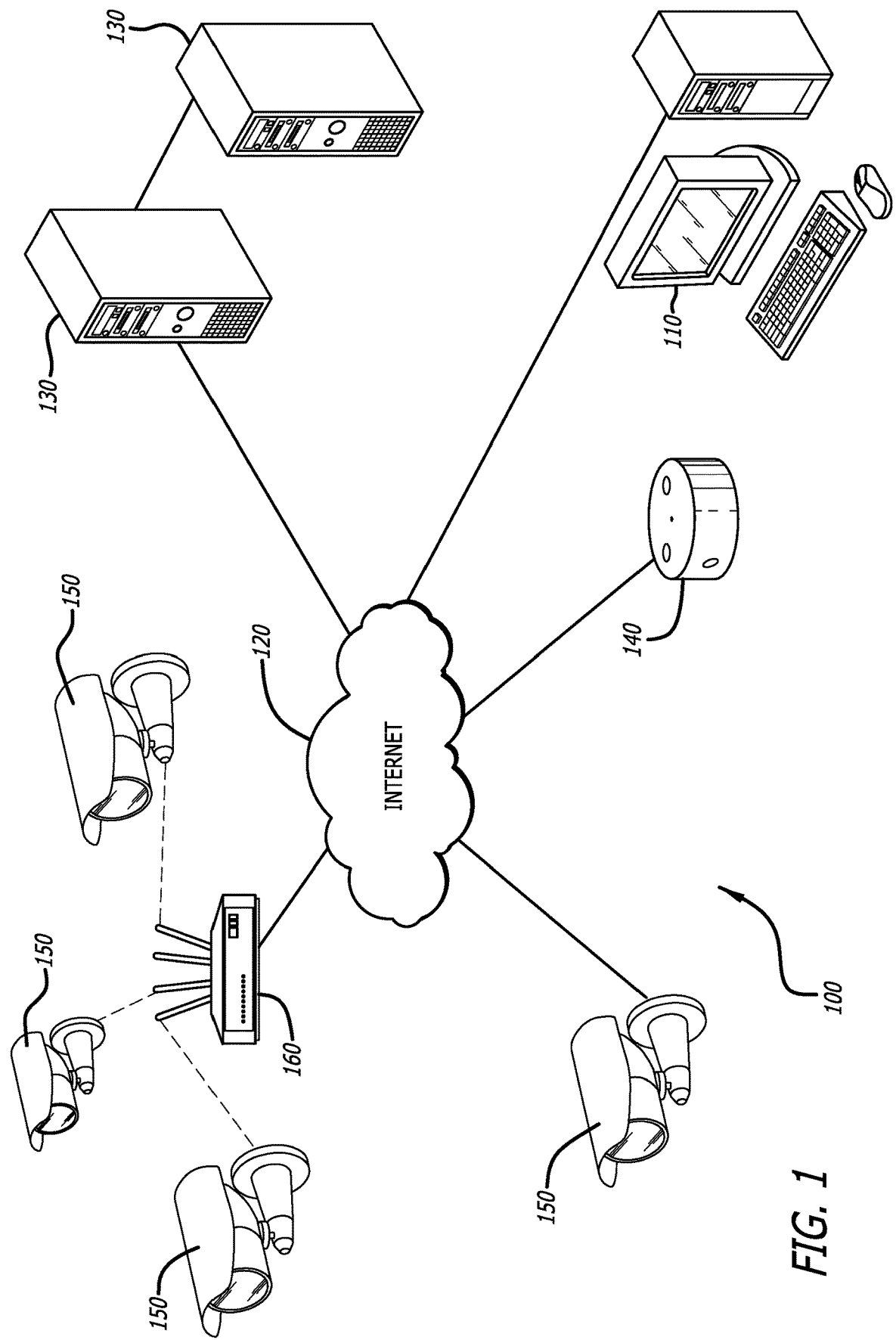
FIG. 1 is a conceptual illustration of a video image data processing system in accordance with an embodiment of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the problems described above, systems and methods are discussed herein that describe processes for utilizing filters (i.e., intermediate layers) to streamline the processing of video image data within neural networks. Specifically, many embodiments of the disclosure can limit the amount of processing required for video image data by utilizing and/or sharing the outputs of intermediate (or hidden) layers of the neural network. Use is also made of different types of video data storage having different characteristics depending upon the nature of the data stored therein.

Embodiments of the present disclosure can be utilized in a variety of fields including general video analytics, facial recognition, object segmentation, object recognition, autonomous driving, traffic flow detection, drone navigation/operation, stock counting, inventory control, and other automation-based tasks that generate time-series based data. The use of these embodiments can result in fewer required computational resources to produce similarly accurate results compared to a traditional convolutional or other neural network. In this way, more deployment options may become available as computational resources increase and become more readily available on smaller and less expensive electronic devices.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, field-programmable gate arrays ("FPGAs") or other discrete components. A function may also be implemented in programmable hardware devices such as programmable array logic, programmable logic devices, or the like.

"Neural network" refers to any logic, circuitry, component, chip, die, package, module, system, sub-system, or computing system configured to perform tasks by imitating biological neural networks of people or animals. Neural network, as used herein, may also be referred to as an artificial or deep neural network (DNN). Examples of neural networks that may be used with various embodiments of the disclosed solution include, but are not limited to, convolutional neural networks, feed forward neural networks, radial basis neural network, recurrent neural networks, modular neural networks, and the like. Certain neural networks may be designed for specific tasks such as object detection and/or image classification. Examples of neural networks suitable for object detection include, but are not limited to, Region-based Convolutional Neural Network (RCNN), Faster Region-based Convolutional Neural Network (Faster R-CNN), You Only Look Once (YOLO), and the like. Examples of neural networks suitable for image classification may include, but are not limited to, Googlenet Inception, Resnet, Mobilenet, Densenet and Efficientnet.

A neural network may include both the logic, software, firmware, and/or circuitry for implementing the neural network as well as the data and metadata for operating the neural network. One or more of these components for a neural network may be embodied in one or more of a variety of repositories, including in one or more files, databases, folders, or the like. The neural network used with embodiments disclosed herein may employ one or more of a variety of learning models including, but not limited to, supervised learning, unsupervised learning, and reinforcement learning. These learning models may employ various backpropagation techniques.

Functions or other computer-based instructions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, assembly languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions, logics and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In some embodiments, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions, logics, and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, loading, storing, buffering, and/or transferring data can include the entirety of the data, a portion of the data, a set of the data, and/or a subset of the data. Likewise, reference to reading, writing, loading, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a conceptual illustration of a video image data processing system 100 in accordance with an embodiment of the disclosure is shown. In many embodiments, it may be desired to monitor one or more visual areas by installing security cameras 150 within those areas. The security cameras 150 can generate a plurality of video image data (i.e., "video content") that can be processed. In a number of embodiments, the processing of the video image data will be configured to determine if one or more specific objects are within the monitored visual areas. In a number of embodiments, this detection may be presented as an inference map image from an object detection neural network which can be a segmentation or panoptic map. These maps can be utilized as a classification as to whether a specific object is present within the input data or not. These maps can be generated as an output from a neural network such as, but not limited to, a convolutional neural network (CNN). By way of example, and not limitation, video image data processing can be established to detect the presence of one or more pedestrians within the monitored visual areas. It will be understood by those skilled in the art that the video image data processing may be performed by processors internal to security cameras 150 or elsewhere in the system or in some combination thereof. The video image data processing may be implemented in software operating in conventional processors (e.g., CPU, MPU, GPU, RISC, etc.), and/or software operating in specifically purposed processors optimized to implement neural networks—or some combination thereof. In fact, the entire system may be considered a processor or a distributed processor.

Often, the video image data processing system 100 will process the video image data within a centralized video processing server 110, although some embodiments may offload various processing tasks to other devices such as, but not limited to servers 130 which may be specialized or edge type servers, or internal to the security cameras 150 (themselves edge network devices). A video processing server 110 is often connected to a network 120 such as the Internet as depicted in FIG. 1. A plurality of security cameras 150 can also be attached to the network 120 such that they are communicatively coupled to the video processing server 110 which comprises one or more processors for processing video image data like, for example, CPUs, MPUs, GPUs, etc. Although the embodiment of FIG. 1 depicts security cameras 150, it will be understood by those skilled in the art that any video image data capture device may be utilized as required by the desired application.

The security cameras 150 can be wired directly to the network 120 or may be wirelessly connected via one or more wireless access points 160. In this way, a variety of potential deployment arrangements may be realized to properly cover the desired areas for surveillance. In theory, there is no limit to the number of deployed security cameras 150 or other video image data capture devices that may be communicatively coupled with the video processing server 110. The limitations experienced may relate to the available bandwidth of the network 120 and computational resources of the video processing server 110 or other supplemental server 130. As discussed below, many embodiments of the video image data processing system 100 can handle the bulk of the processing locally by security cameras 150 or other edge network devices 140 to minimize network traffic and reduce the need for centralized computing resources like video processing server 110 and servers 130.

Figure 2:
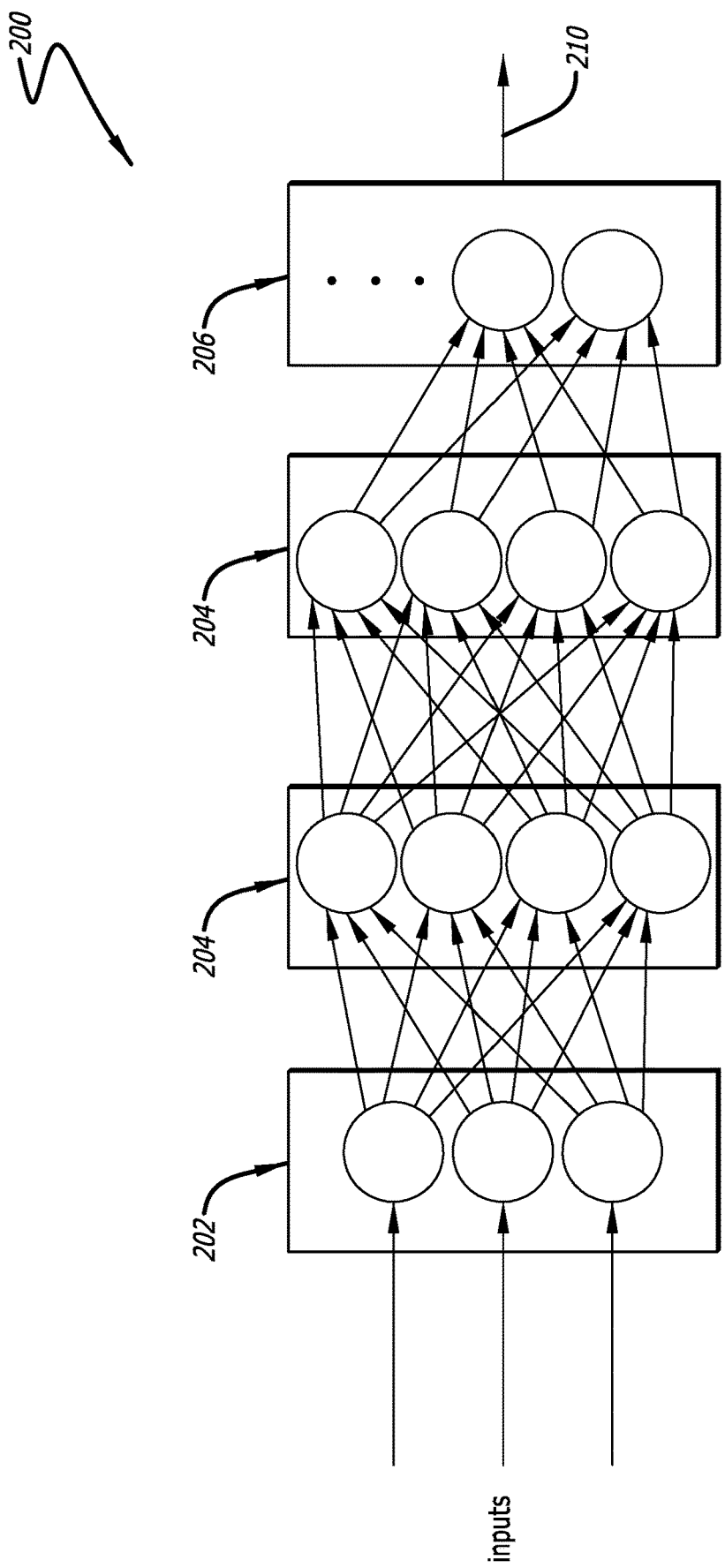
FIG. 2 is a conceptual illustration of an artificial neural network in accordance with an embodiment of the disclosure.

Referring to FIG. 2, a conceptual illustration of an artificial neural network 200 in accordance with an embodiment of the disclosure is shown. At a high level, the artificial neural network 200 comprises an input layer 202, one or more intermediate layers 204, and an output layer 206. The artificial neural network 200 comprises a collection of connected units or nodes called artificial neurons which loosely model the neurons in a biological brain. Each connection, like the synapses in a biological brain, can transmit a signal from one artificial neuron to another. An artificial neuron that receives a signal can process the signal and then trigger additional artificial neurons within the next layer of the neural network. As those skilled in the art will recognize, the artificial neural network 200 depicted in FIG. 2 is shown as an illustrative example and various embodiments may comprise artificial neural networks that can accept more than one type of input and can provide more than one type of output.

In a typical embodiment, the signal at a connection between artificial neurons is a real number, and the output of each artificial neuron is computed by some non-linear function (called an activation function) of the sum of the artificial neuron's inputs. The connections between artificial neurons are called "edges" or axons. Artificial neurons and edges typically have a weight that adjusts as learning proceeds. The weight increases or decreases the strength of the signal at a connection. Artificial neurons may have a threshold (trigger threshold) such that the signal is only sent if the aggregate signal crosses that threshold. Typically, artificial neurons are aggregated into layers. Different layers may perform different kinds of transformations on their inputs. Signals propagate from the first layer (the input layer 202) to the last layer (the output layer 206), possibly after traversing one or more intermediate layers (also called hidden layers) 204.

The inputs to an artificial neural network may vary depending on the problem being addressed. In object detection, the inputs may be data representing pixel values for certain pixels within an image or frame. In one embodiment the artificial neural network 200 comprises a series of hidden layers in which each neuron is fully connected to neurons of the next layer. The artificial neural network 200 may utilize an activation function such as sigmoid, nonlinear, or a rectified linear unit (ReLU), upon the sum of the weighted inputs for example. The last layer in the artificial neural network may implement a regression function such as SoftMax regression to produce the classified or predicted classifications output for object detection as output 210. In further embodiments, a sigmoid function can be used and position prediction may need raw output transformation into linear and/or non-linear coordinates.

In certain embodiments, the artificial neural network 200 is trained prior to deployment and to conserve operational resources. However, some embodiments may utilize ongoing training of the artificial neural network 200 especially when operational resource constraints such as die area and performance are less critical.

Figure 3:
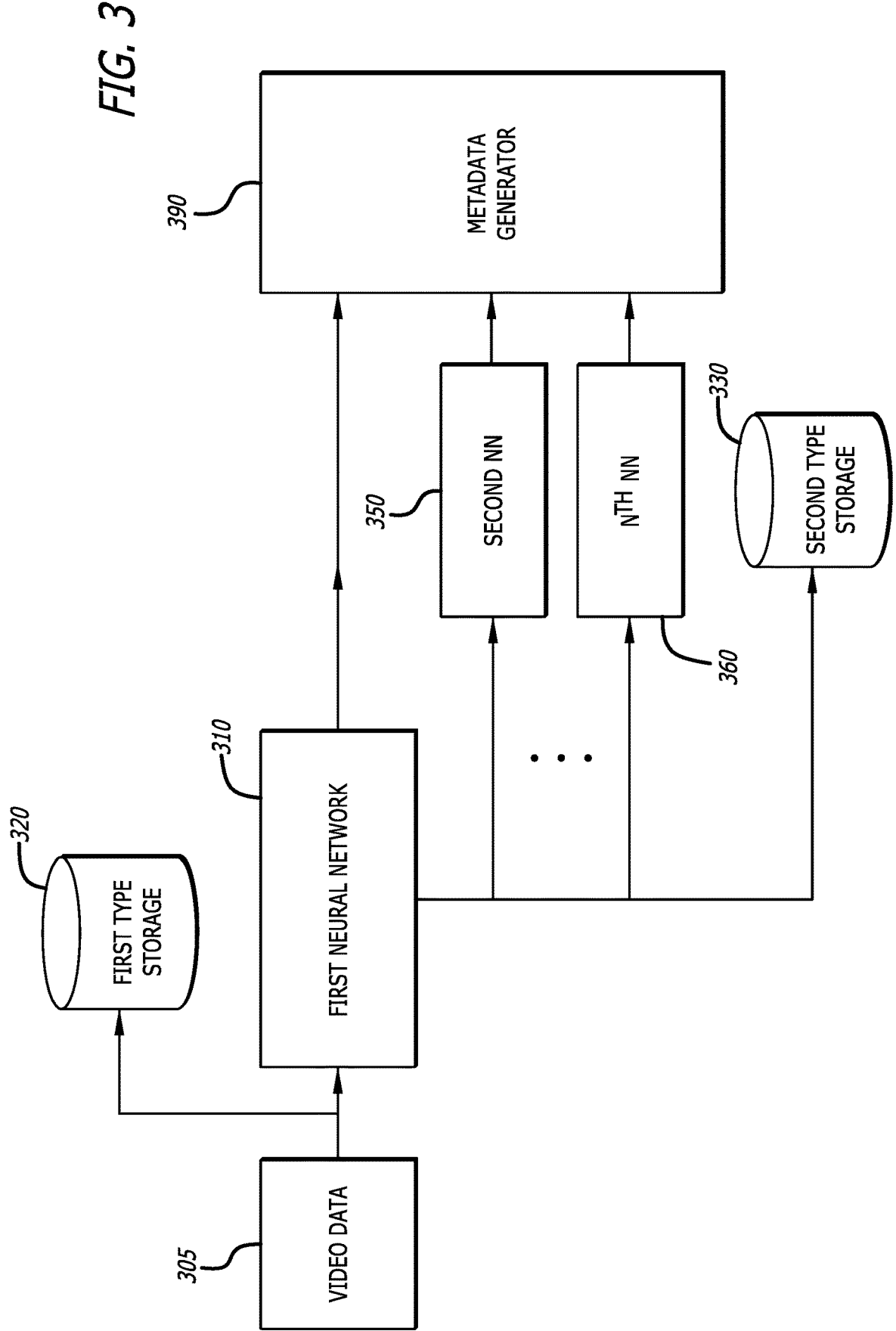
FIG. 3 is a conceptual illustration of a neural network video processing and storage system in accordance with an embodiment of the disclosure.

Referring to FIG. 3, a conceptual illustration of a neural network video processing and storage system in accordance with an embodiment of the disclosure is shown. Present in FIG. 3 are a video data source 305, a first artificial neural network 310, a first storage device type 320 (shown as "first type storage"), a second storage device type 330 (shown as "second type storage"), a second artificial neural network 350, a $N^{th}$ artificial neural network 360, and a metadata generator 390. The video data source 305 may be coupled to an input of the first artificial neural network 310 and to the first storage device type 320. A first output of the first artificial neural network 310 may be coupled to the metadata generator 390. A second output of the first artificial neural network 310 may be coupled to the second data storage device type 330. The second output of the first artificial neural network 310 may also be coupled to an input of the second artificial neural network 350 and to an input of the $N^{th}$ artificial neural network 360. The metadata generator 390 may be coupled to an output of the second artificial neural network 350 and an output of the $N^{th}$ artificial neural network 360.

Although not shown in FIG. 3, there may be additional artificial neural networks present that may be coupled in parallel with the second artificial neural network 350 and the $N^{th}$ artificial neural network 360. Each additional artificial neural network has an input that may be coupled to the second output of the first (or "primary") artificial neural network 310 and an output that may be coupled to the metadata generator 390. It is contemplated that there may be an arbitrary number of these additional artificial neural networks, the exact number of which may be a matter of application need or design choice. The second (or "secondary") artificial neural network 350, the $N^{th}$ artificial neural network 360, and any others present but not shown in FIG. 3 may be described collectively as secondary artificial neural networks. In a number of embodiments, the primary artificial neural network is a first neural network that processes video image data and outputs data into one or more secondary artificial neural networks.

In many embodiments, the video data source 305 presents raw video image data from one or more surveillance or security cameras or other devices that may be analyzed by the first artificial neural network 310. Internal to the first artificial neural network 310 may be an input layer, a series of intermediate layers, and an output layer. Each intermediate layer may output intermediate layer data which may then be input to the next intermediate layer (or input to the output layer in the case of the last intermediate layer). The first output of the first artificial neural network 310 may be the output of its output layer. The data at this first output may be presented to the metadata generator 390 which may generate metadata (e.g., the results of the computations). The second output of the first artificial neural network 310 may be the output of one or more of its intermediate layers.

In many embodiments, the first artificial neural network 310 and the secondary artificial neural networks (350, 360, etc.) may implement models for detecting objects and/or their attributes and/or the like. In a number of embodiments, these models may comprise coefficients for use in multiply-accumulate operations performed by each of the neurons (or nodes) present in the artificial neural networks 310, 350, 360, etc. Typically, these models may be derived from a training sequence performed before deployment, though in some embodiments the training can occur within the neural network video processing and storage system.

The raw video data from video data source 305 may be stored by first data storage device type 320. In various embodiments, the first data storage device type 320 may be a fast-writing storage device optimized for continuous video writing. In many embodiments, the data stored in first data storage device type 320 may typically be archival data which may only be accessed occasionally if additional analysis is required later, so it may be optimized for fast writing to keep up with the continuous raw video data from video data source 305.

In more embodiments, the second data storage device type 330 may be a fast-access storage device. In further embodiments, the first data storage device type 320 and second data storage device type 330 may be a single device such as, but not limited to, a hybrid hard disk drive with one or more solid state memory arrays available within the drive. Alternatively, certain embodiments may use a hybrid storage system comprising rotating magnetic recording media and solid state memory arrays. The intermediate layer data from the second output of the first artificial neural network 310 may be used repeatedly for either current or future analysis by the secondary neural networks 350, 360, and any others not shown in FIG. 3. This may entail a high volume of random access reads and second data storage device type 330 which may be optimized for fast read access to the data.

In many embodiments, the first artificial neural network 310 may comprise, for example, an object detection neural network, though other types of neural networks may be used. In some embodiments, the second artificial neural network 350, the Nth artificial neural network 360, and any other secondary neural networks present may use the intermediate layer data from first artificial neural network 310 to obtain more detail from, for example, the objects detected by first artificial neural network 310.

If a detected object is a person, for example, a secondary neural network comprising a recognition neural network may, for example, identify the person; and/or a secondary neural network comprising a tracking neural network may, for example, follow the path taken by the person across the field of vision of multiple cameras; and/or a secondary neural network comprising an attribute detection neural network may, for example, identify any of a number of attributes (or characteristics) like, for example, age, gender, hair color, the presence of glasses or a mask, the color or type of clothing, shoes, etc. If a detected object is an animal or some inanimate object, for example, secondary artificial neural networks may be used to track or identify similar appropriate attributes. The data at the outputs of the secondary artificial neural networks may be presented to metadata generator 390 which may generate metadata (e.g., the results of these computations). In some embodiments, one or more of these artificial neural networks may comprise, for example, a convolutional neural network.

Figure 4:
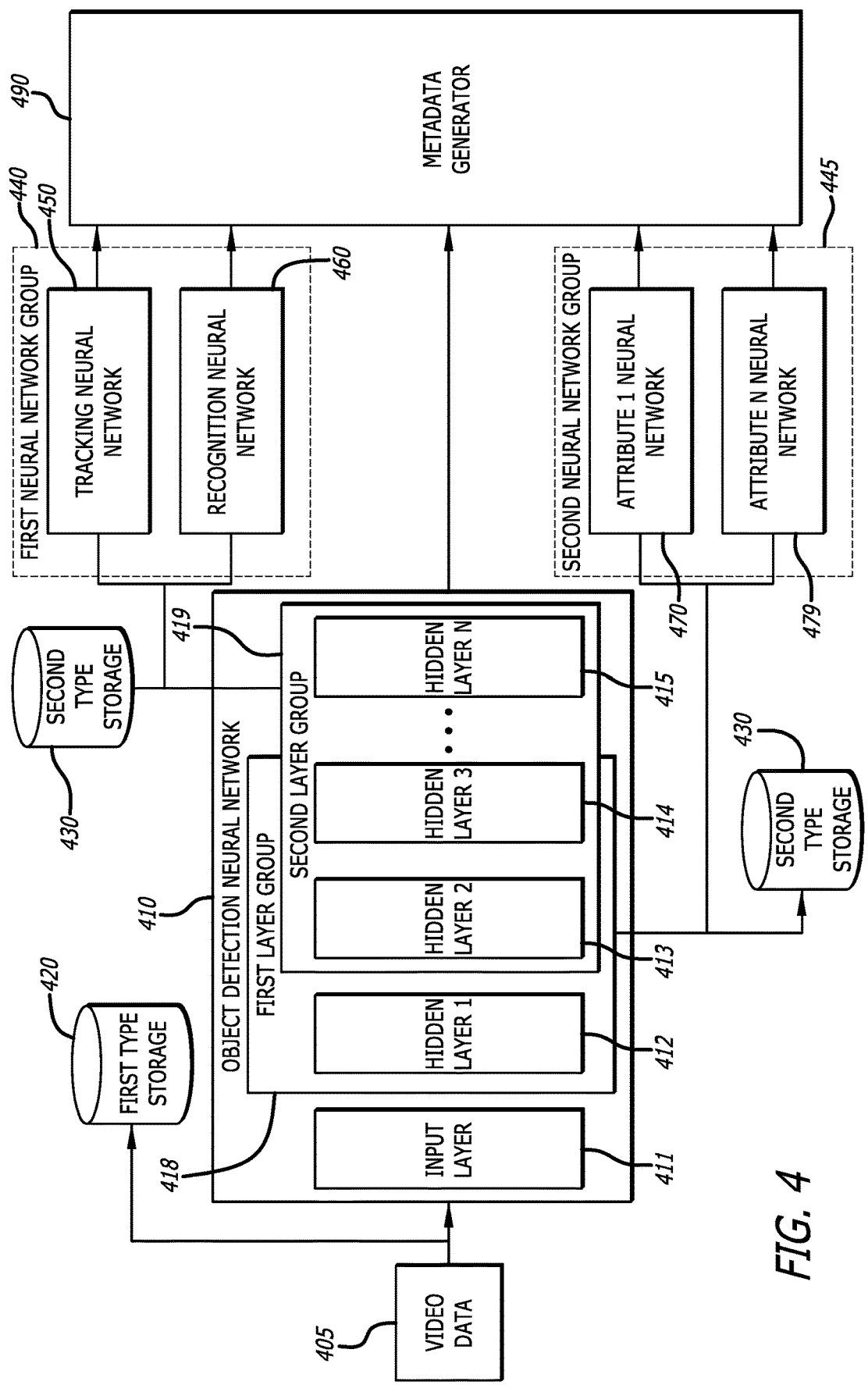
FIG. 4 is a conceptual illustration of a neural network video processing and storage system in accordance with an embodiment of the disclosure.

Referring to FIG. 4, a conceptual illustration of a neural network video processing and storage system in accordance with an embodiment of the disclosure is shown. Present in FIG. 4 are video data source 405, first artificial neural network 410, fast-writing storage device 420, fast-access storage device 430, first neural network group 440, second neural network group 445, and metadata generator 490.

First neural network group 440 may comprise a plurality of artificial neural networks including a tracking neural network 450 and recognition neural network 460, but other secondary artificial neural networks may also be present. Second neural network group 445 may comprise a plurality of secondary artificial neural networks including first attribute neural network 470 and $N^{th}$ attribute neural network 479, but other secondary artificial neural networks for other attributes may also be present.

The video data source 405 may be coupled to an input of the first artificial neural network 410 and to the fast-writing storage device 420 (shown as "first type storage"). A first output of first artificial neural network 410 may be coupled to the metadata generator 490. Second and third outputs of the first artificial neural network 410 may be coupled to one or more of the fast-access storage devices 430 (shown as "second type storage"). The second output of first artificial neural network 410 may also be coupled to an input of the tracking neural network 450, to an input of the recognition neural network 460, and to the inputs of any other artificial neural networks that may be present in the first neural network group 440. The third output of the first artificial neural network 410 may also be coupled to an input of the first attribute neural network 470, to an input of the $N^{th}$ attribute neural network 479, and to the inputs of any other artificial neural networks present in the second neural network group 445. The outputs of the artificial neural networks of first neural network group 440 and second neural network group 445 may be coupled to metadata generator 490.

The video data source 405 can present raw video data from one or more surveillance or security cameras or other devices that may be analyzed by first artificial neural network 410. In many embodiments, internal to the first artificial neural network 410 may be an input layer 411, a series of intermediate layers 412, 413, 414, and 415, and an output layer (not shown). Although four intermediate layers are shown in the figure, it will be appreciated that an arbitrary number of intermediate layers may be present depending on the application need and design choice. Each intermediate layer may output intermediate layer data which may then be input to the next intermediate layer (or input to the output layer in the case of the last intermediate layer 415). The first output of the first artificial neural network 410 may be the output of its output layer. The data at this first output may be presented to the metadata generator 490 which may generate various metadata (e.g., the results of the computations).

In additional embodiments, the first artificial neural network 410 may further comprise a first layer group 418 and a second layer group 419. The first layer group 418 may comprise internal intermediate layers 412, 413 and 414 (shown as "hidden layers"), though it will be understood that any number internal layers may be present. The second layer group 419 may comprise internal layers 413, 414, and 415, though it will be understood that any number internal layers may be present. The first layer group 418 and the second layer group 419 may share a number of intermediate layers like, for example, intermediate layers 413 and 414 though it will be understood that any number internal layers may be shared. One or more of the intermediate layers comprising the second layer group 419 may be coupled to the second output of the first artificial neural network 410, while one or more of the intermediate layers comprising the first layer group 418 may be coupled to the third output of the first artificial neural network 410.

These layer groups 418, 419 may be grouped together to generate unique intermediate layer data. In certain embodiments, various secondary artificial neural networks may be optimized to expect input of a certain type. The layer groups 418, 419 may be selected or configured to output intermediate layer data in a format that the various types of secondary artificial neural networks expect. In this way, intermediate layer data may be comprised of not only each hidden/intermediate layers output, but also various combinations of those intermediate layers. These combinations allow for an increased number of uses within secondary neural networks, which can save processing time, storage, and energy by omitting at least part of the video image data processing in these secondary artificial neural networks.

In many embodiments, the first artificial neural network 410 and the secondary artificial neural networks comprising first layer group 418 and the second layer group 419 may implement models for detecting objects and/or their attributes and/or the like. These models may comprise coefficients for use in multiply-accumulate operations performed by each of the neurons (or nodes) present in the artificial neural networks 410, 450, 460, 470, 479, and any other secondary artificial neural networks present. Typically, these models may be derived from a training sequence performed before the deployment, though in some embodiments the training can occur within the neural network video processing and storage system.

The raw video data from video data source 405 may be stored by fast-writing storage device 420. The data stored in fast-writing storage device 420 is typically archival data which may only be accessed occasionally if additional analysis is required later, so the fast-writing storage device 420 may be optimized for fast writing to keep up with the continuous raw video data from the video data source 405.

The intermediate layer data from the second and third outputs of first artificial neural network 410 may be stored in one or more fast-access storage devices 430. The intermediate layer data may be used repeatedly for either current or future analysis by the secondary neural networks. This may entail a high volume of random access reads and second data storage device type 430 may be optimized for fast read access to the data.

In many embodiments, first artificial neural network 410 may comprise, for example, an object detection neural network, though other types of neural network may be used. In some embodiments, the tracking neural network 450, the recognition neural network 460, and the attribute neural networks present 470, 479 may use the intermediate layer data from first artificial neural network 410 to obtain more detail from, for example, the objects detected by first artificial neural network 410.

If an object detected by the first artificial neural network 410 is a person, for example, the recognition neural network 460 may identify the person. The tracking neural network 450 may also follow the path taken by the person across the field of vision of multiple cameras. Additionally, one or more of the attribute detection neural networks in second neural network group 445 may identify any of a number of attributes (or characteristics) like, for example, age, gender, hair color, the presence of glasses or a mask, the color or type of clothing, shoes, etc. In some embodiments, if a detected object is an animal or some inanimate object, the secondary artificial neural networks in first neural network group 440 and in second neural network group 445 may be used to track or identify similar appropriate attributes. The data at the outputs of the secondary artificial neural networks may be presented to the metadata generator 490 which may generate metadata associated with the video image data. In certain embodiments, one or more of these artificial neural networks may comprise, for example, a convolutional neural network.

Figure 5:
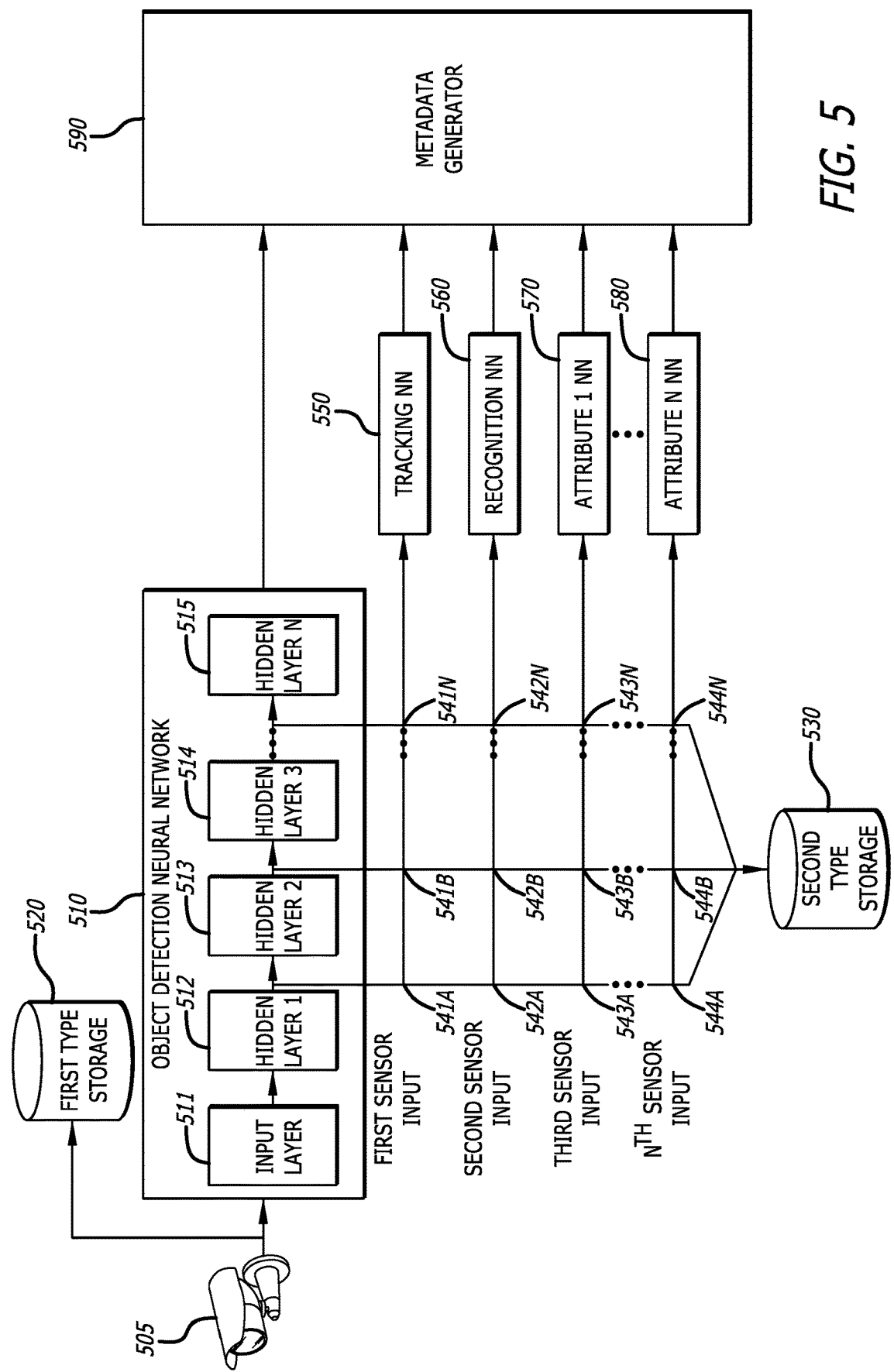
FIG. 5 is a conceptual illustration of a neural network video processing and storage system in accordance with an embodiment of the disclosure.

Referring to FIG. 5, a conceptual illustration of a neural network video processing and storage system in accordance with an embodiment of the disclosure is shown. Present in FIG. 5 are a video data source 505, first neural network 510, a first storage device 520 (shown as "first type storage"), metadata generator 590, and a plurality of secondary artificial neural networks including, but not limited to, tracking neural network 550, recognition neural network 560, and a plurality of attribute neural networks from first attribute neural network 570 through $N^{th}$ attribute neural network 580. Also present in FIG. 5 is an intermediate layer matrix which may comprise first tensor set of intermediate layer data (541A, 541B . . . 541N), second tensor set of intermediate layer data (542A, 542B . . . 542N), third tensor set of intermediate layer data (543A, 543B . . . 543N), and Nth tensor set of intermediate layer data (544A, 544B . . . 544N).

In the embodiment depicted in FIG. 5, the video data source 505 may be coupled to an input of first artificial neural network 510 and to first storage device 520 which may be a fast-writing storage device. A first output of first artificial neural network 510 may be coupled to metadata generator 590. First artificial neural network 510 comprises input layer 511, intermediate layers 512, 513, and 514 (shown as "hidden layers"), and output layer 515 (shown as "hidden layer N)". While three intermediate layers 512, 513, and 514 are shown in the figure, it is understood that an arbitrary number of intermediate layers may be present which may be dependent on application need and/or design choice. The intermediate layer data of each layer may be connected to the second storage device 530 which may be a fast-access storage device. In different embodiments, one, some, or all of the intermediate layer data may be output from first artificial neural network 510 and stored in the second storage device 530.

The intermediate layer data outputs of the first artificial neural network 510 may be coupled to the inputs of the one or more secondary artificial neural networks including, but not limited to, tracking neural network 550, recognition neural network 560, and first attribute neural network 570 through Nth attribute neural network 580. This coupling may take place through the intermediate layer matrix which may comprise first tensor set of intermediate layer data (541A, 541B . . . 541N), second tensor set of intermediate layer data (542A, 542B . . . 542N), third tensor set of intermediate layer data (543A, 543B 543N), and Nth tensor set of intermediate layer data (544A, 544B . . . 544N).

It is understood that the number of tensor sets of intermediate layer data 541, 542, and 543 through 544 may be equal to the number of secondary artificial neural networks 550, 560, and 570 through 580. It is also understood that the number of inputs in each tensor set of intermediate layer data may be equal to the number of intermediate layer data outputs (A, B . . . . N) from first artificial network 510. The outputs of the secondary artificial neural networks including, but not limited to, the tracking neural network 550, the recognition neural network 560, and the first attribute neural network 570 through Nth attribute neural network 580 may be coupled to metadata generator 590.

In many embodiments, the first artificial neural network 510 and the secondary artificial neural networks 550, 560, and 570 through 580 may implement models for detecting objects and/or their attributes and/or the like. These models may comprise coefficients for use in multiply-accumulate operations performed by each of the neurons (or nodes)

present in the secondary artificial neural networks 550, 560, and 570 through 580. Typically, these models may be derived from a training sequence performed before the deployment, though in some embodiments the training can occur within the neural network video processing and storage system.

In some embodiments the intermediate layer matrix, which may comprise the first tensor set of intermediate layer data (541A, 541B . . . 541N), the second tensor set of intermediate layer data (542A, 542B . . . 542N), the third tensor set of intermediate layer data (543A, 543B . . . 543N), and the Nth tensor set of intermediate layer data (544A, 544B . . . 544N), may be fully populated, while in alternative embodiments it may only be partially populated. In many embodiments the intermediate layer matrix may be implemented using hardware switches, while in other embodiments the interconnections may be implemented in software or may be built into the model coefficients. For example, setting the coefficients to zero for unwanted connections may effectively remove the undesired part of the models from the secondary artificial neural networks.

The raw video data from video data source 505 may be stored by first storage device 520 which may be a fast-writing storage device. The data stored in first storage device 520 is typically archival data which may only be accessed occasionally if additional analysis is required later, so first storage device 520 may be optimized for fast writing to keep up with the continuous raw video data from video data source 505.

The intermediate layer data from the first artificial neural network 510 may be stored in the second storage device 530 (shown as "second type storage") which may be a fast-access storage device. The intermediate layer data may be used repeatedly for either current or future analysis by the secondary neural networks. This may entail a high volume of random access reads and second storage device 530 may be optimized for fast read access to the data.

If an object detected by the first artificial neural network 510 is a person, for example, the recognition neural network 560 may, for example, identify the person; and/or tracking neural network 550 may, for example, follow the path taken by the person across the field of vision of multiple cameras; and/or one or more of the attribute neural networks 570 through 580 may, for example, identify any of a number of attributes (or characteristics) like, for example, age, gender, hair color, the presence of glasses or a mask, the color or type of clothing, shoes, etc. If a detected object is an animal or some inanimate object, for example, the attribute neural networks 570 through 580 may be used to track or identify similar appropriate attributes. The data at the outputs of the secondary artificial neural networks may be presented to metadata generator 590 which may generate metadata (e.g., the results of these computations). In some embodiments, one or more of these artificial neural networks may comprise, for example, a convolutional neural network.

Figure 6:
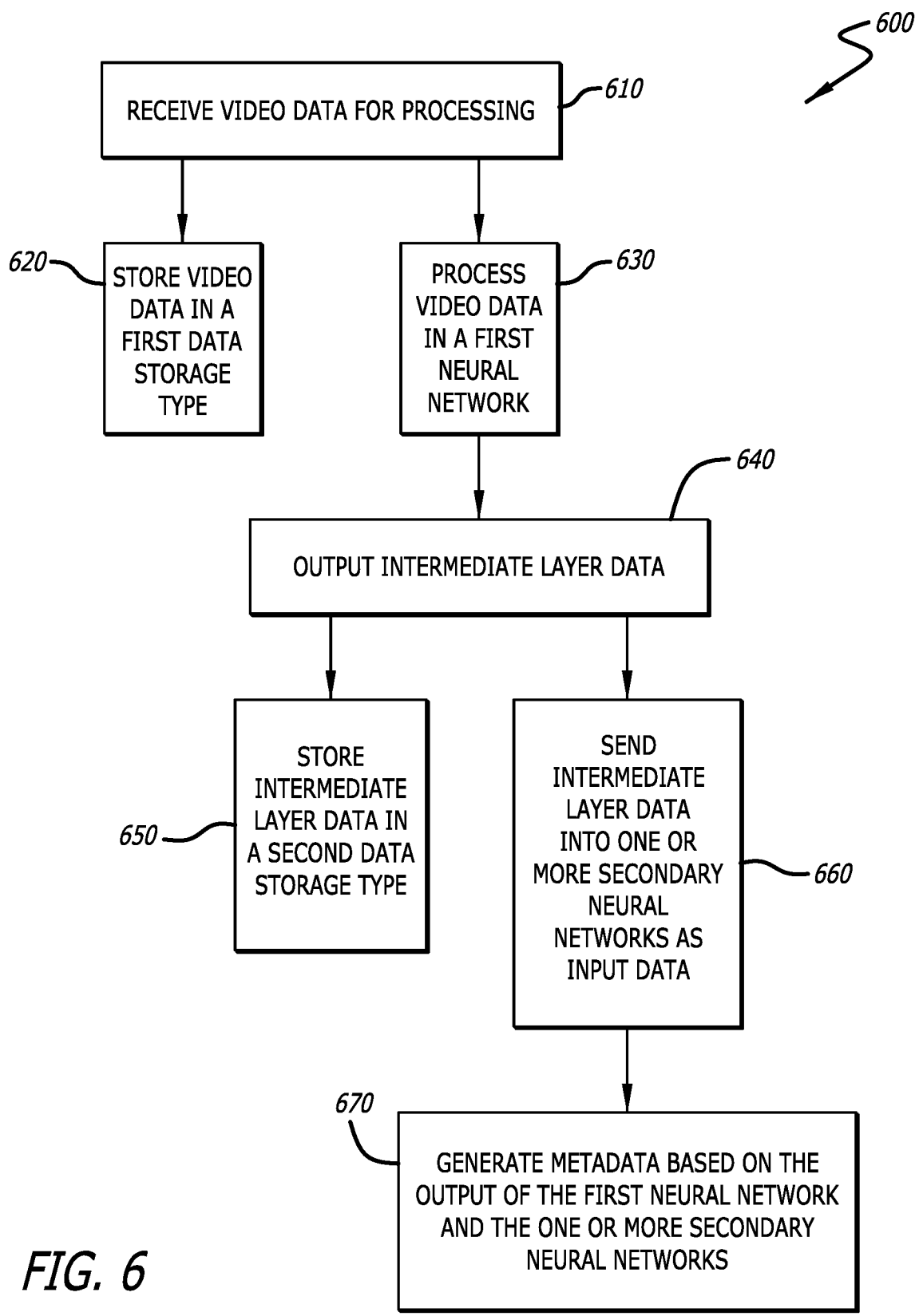
FIG. 6 is a flowchart of a process using a neural network video processing and storage system in accordance with an embodiment of the disclosure.

Referring to FIG. 6, a flowchart of a process 600 using a neural network video processing and storage system in accordance with an embodiment of the disclosure is shown. Process 600 may begin by receiving video data for processing (block 610). The video data may come from a variety of sources like, for example, a surveillance or security camera or some other device. In many embodiments, the process 600 may then store the video data in a first data storage type (block 620). The data stored in the first data storage device type may be archival data, which may only be accessed occasionally if additional analysis is required later, so it may be optimized for fast writing to keep up with the continuous raw video data from video data source.

The process 600 may also process the received video data through a first neural network (block 630). The first neural network may comprise an input layer, one or more intermediate layers, and an output layer. The intermediate layers may produce intermediate layer data that may be output from the first neural network (block 640). The intermediate layer data may then be stored in a second data storage type (block 650). The volume of the intermediate layer data may be substantially less than the received video data. The intermediate layer may be used repeatedly for analysis and the nature of the data may require many random-access reads, so the second data storage type may be optimized for fast read data access.

The first and second data storage types may be implemented using the same or different persistent memory technologies. For example, in some embodiments flash non-volatile memory (NVM) integrated circuits may be used for both data storage types. The first data storage type might use multiple bit per memory cell (e.g., multi-level cell (MLC), tri-level cell (TLC), quad-level cell (QLC)) technology (maybe along with video compression) to reduce the memory footprint of the received video data, while second data storage type might use single bit per memory cell (e.g., single level cell (SLC)) technology which has faster read access times. In further embodiments, hard disk drives (HDD) maybe used. In this case, the inner portion of each platter may be used for first data type storage (due to the slower disk velocity) while the outer portion of each platter may be used for faster read access times (due to the greater disk velocity). In still other embodiments, a hybrid system combining an HDD with a solid state drive (SSD) could be used, where the first data storage type may be implemented in a less expensive per bit and larger capacity HDD, and the second data storage type may be implemented in a faster but more expensive per bit solid state drive (SSD). In some alternate embodiments, second data storage type by also be maintained for a short period in DRAM or in fast NVM technologies like, for example, MRAM, RRAM, PCM, etc.

The intermediate layer data may also be sent to the inputs of one or more secondary neural networks (block 660). Metadata may then be generated based upon the outputs of the first neural network and the one or more secondary neural networks (block 670). This may provide a more efficient method of neural network modelling due to the use of the intermediate layer data from the first neural network by the one or more secondary neural networks.

This may work particularly well when the first neural network is an object identification neural network, and the secondary neural networks perform functions related to the object being identified. The secondary neural networks can perform functions like, for example, recognizing someone if the identified object is a person, a pet or other animal, or a unique inanimate object; and/or determining different attributes about the identified person (age, gender, etc.), animal (species, fur color, presence of a collar, etc.), or inanimate object (shape, material, etc.).

The sharing and/or reusing of the intermediate layer data takes advantage of the computation, time, and energy required to obtain it because it may be used by many different secondary neural network models. If additional analysis is needed at a future time, new models can be trained and deployed in one or more of the secondary neural networks and only the additional time and energy of running the necessary secondary neural networks is needed.

Figure 7:
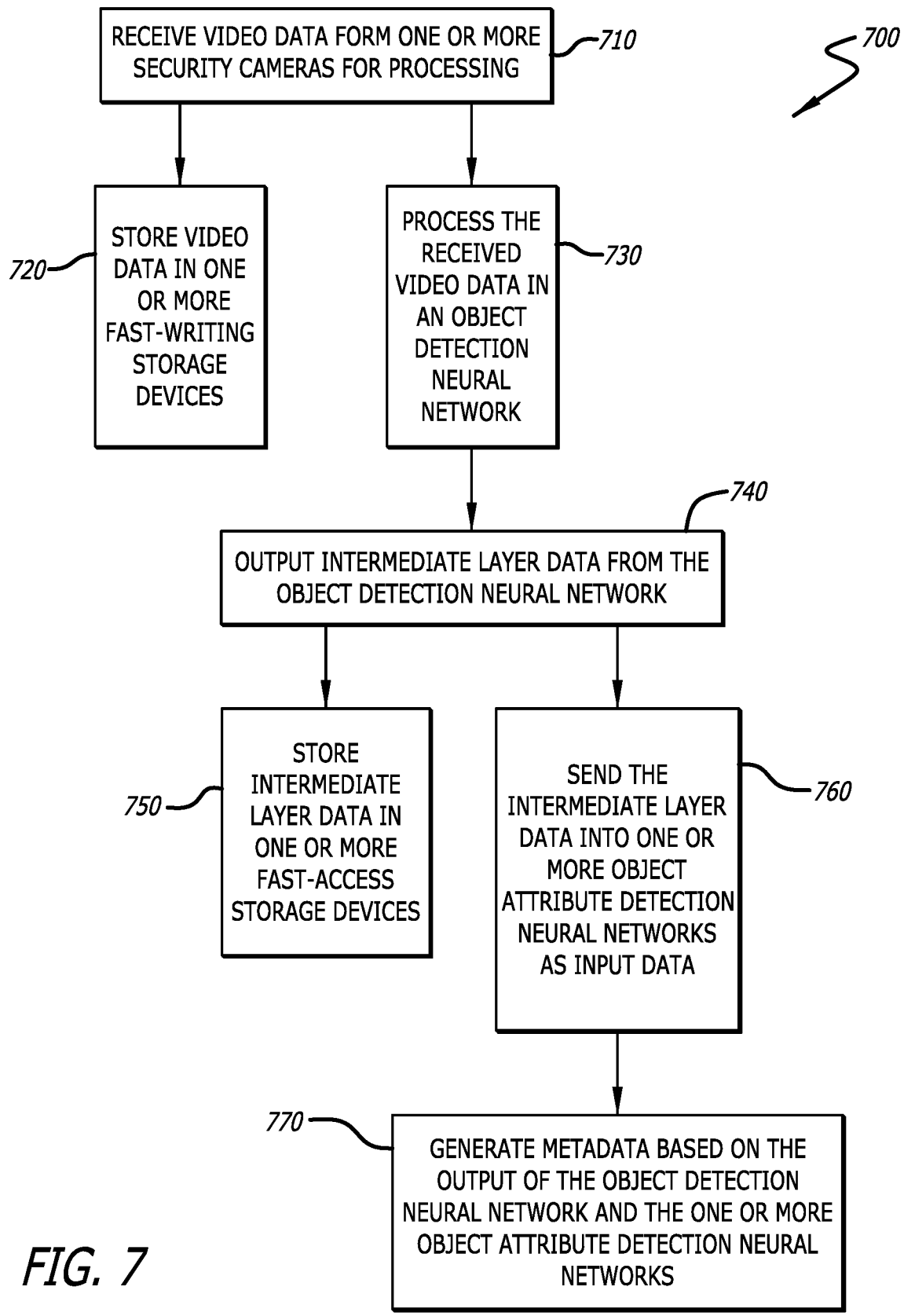
FIG. 7 is a flowchart of a process using a neural network video processing and storage system in accordance with an embodiment of the disclosure.

Referring to FIG. 7, a flowchart of a process 700 using a neural network video processing and storage system in accordance with an embodiment of the disclosure is shown. Process 700 may begin by receiving video data from one or more security cameras for processing (block 710). The process 700 may then store the video data in one or more fast-writing storage devices (block 720). This data may be accessed at a future time if additional video processing is needed. The data stored in the fast-writing storage devices may be archival data, which may only be accessed occasionally if additional analysis is required later, so it may be optimized for fast writing to keep up with the continuous raw video data from video data source.

The process 700 may also process the received video data in an object detection neural network (block 730). The object detection neural network may comprise an input layer, one or more intermediate layers, and an output layer. The intermediate layers may each produce intermediate layer data that may be output from the object detection neural network (block 740). The intermediate layer data may then be stored in one or more fast-access storage devices (block 750).

The volume (i.e., file size) of the intermediate layer data may be substantially less than the received video data. The intermediate layer data may be used repeatedly for analysis and the nature of the data may require many random-access reads, so the second data storage type may be optimized for fast read data access.

The fast-writing storage devices and the fast-access storage devices may be implemented using the same or different persistent memory technologies. For example, in some embodiments flash non-volatile memory (NVM) integrated circuits may be used for both data storage device types. The fast-writing storage devices might use multiple bit per memory cell technology (e.g., multi-level cell (MLC), tri-level cell (TLC), quad-level cell (QLC)) to reduce the memory footprint of the received video data, while the fast-access storage devices might use single bit per memory cell technology (e.g., single level cell (SLC)) which has faster read access times. In other embodiments, hard disk drives (HDD) maybe used. In this case, the inner portion of each platter may be used for the fast-writing storage devices (due to the slower disk velocity) while the outer portion of each platter may be used for the fast-access storage devices (due to the greater disk velocity). In still other embodiments, a hybrid system combining a HDD with a solid state drive (SSD) could be used, where the fast-writing storage devices may be implemented in a less expensive per bit and larger capacity HDD, and the fast-access storage devices may be implemented in a faster but more expensive per bit solid state drive (SSD). In some alternate embodiments, the fast-access storage devices by also be maintained for a short period in DRAM or in fast NVM technologies like, for example, MRAM, RRAM, PCM, etc.

The intermediate layer data may also be sent to the inputs of one or more object attribute detection neural networks (block 760). Metadata may then be generated based on the output of the object detection neural network and the outputs of the one or more object attribute detection neural networks (block 770). This may provide a more efficient method of neural network modelling due to the use of the intermediate layer data from the first neural network by the one or more secondary neural networks.

In various embodiments, this arrangement may work particularly well because the first neural network is an object identification neural network, and the secondary neural networks are attribute neural networks that perform functions related to the object being identified. The attribute neural networks can perform functions like, for example, recognizing someone if the identified object is a person, a pet or other animal, or a unique inanimate object; and/or tracking the movement of the identified person, animal, or inanimate object; and/or determining different attributes about the identified person (age, gender, etc.), animal (species, fur color, presence of a collar, etc.), or inanimate object (shape, material, etc.).

The sharing and/or reusing of the intermediate layer data takes advantage of the computation, time, and energy required to obtain it because it may be used by many different secondary neural network attribute models. If additional analysis is needed at a future time, new models can be trained and deployed in one or more of the secondary neural networks and only the additional time and energy of running the necessary secondary neural networks is needed.

Figure 8:
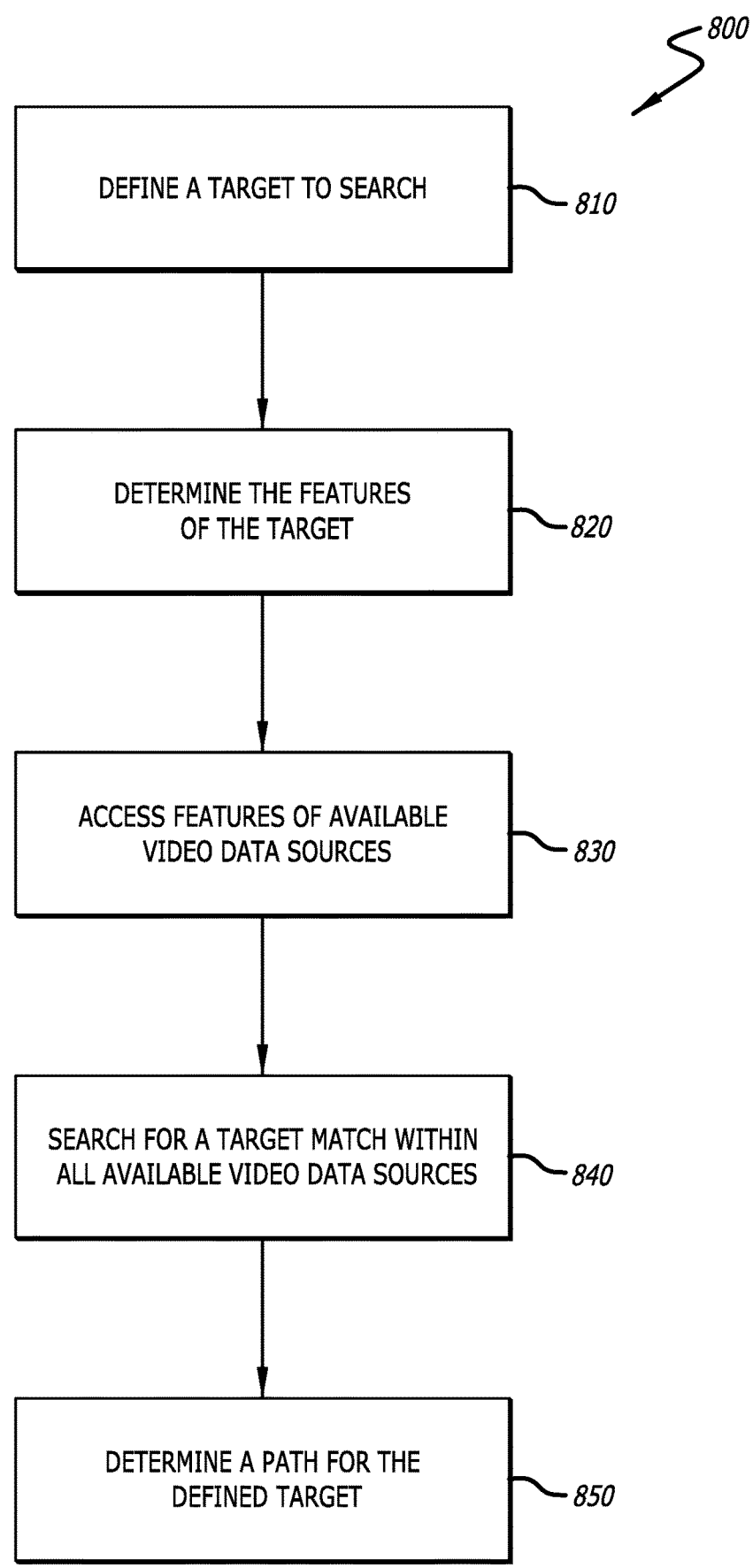
FIG. 8 is a flowchart of a process utilizing intermediate layer data in a neural network video processing and storage system in accordance with an embodiment of the disclosure.

Referring to FIG. 8, a flowchart of a process 800 of utilizing intermediate layer data in a neural network video processing and storage system in accordance with an embodiment of the disclosure is shown. In many embodiments, the process 800 may use intermediate layer data to determine the path of a person, animal, or object from one location to another in a video data pool like, for example, in the surveillance of a public area like an airport or shopping mall. Process 800 may begin by defining a target to search for in the video data pool (block 810). The target may be a person or object of interest and the video data pool may be a plurality of video sources like, for example, surveillance or security cameras.

The features of the target may then be determined (block 820). If the target is a person, the features might be attributes like facial features, age, gender, glasses, hair color, etc. If the target is an object, the features might be attributes like shape, color, surface texture, markings, number array, vector, etc.

The features of available video data sources in the video data pool may then be accessed (block 830). If the features of the target are attributes already known to the video data pool, then a target match may then be searched for in all the available video data sources (block 840). If the target is a person, the search might first involve seeking all candidates identified as persons, in the stored metadata. The metadata for each candidate would be examined attribute by attribute. Candidates would be filtered out as they failed to match attributes. If successful, a series of video frames containing the target from the various available video sources.

In a number of embodiments, sorting the frames by timestamp (or other temporal marker) and noting additional aspects such as, the location of the video source may allow for the path of the defined target to be determined (block 850). As those skilled in the art will recognize, the processing of location and other features and/or attributes can be done numerically which may then be correlated through various means such as, but not limited to, similarity or range of similar values. If the search fails to find a match, then additional secondary models for new but distinctive features of the target may need to be created or utilized to generate metadata for these new features.

Figure 9:
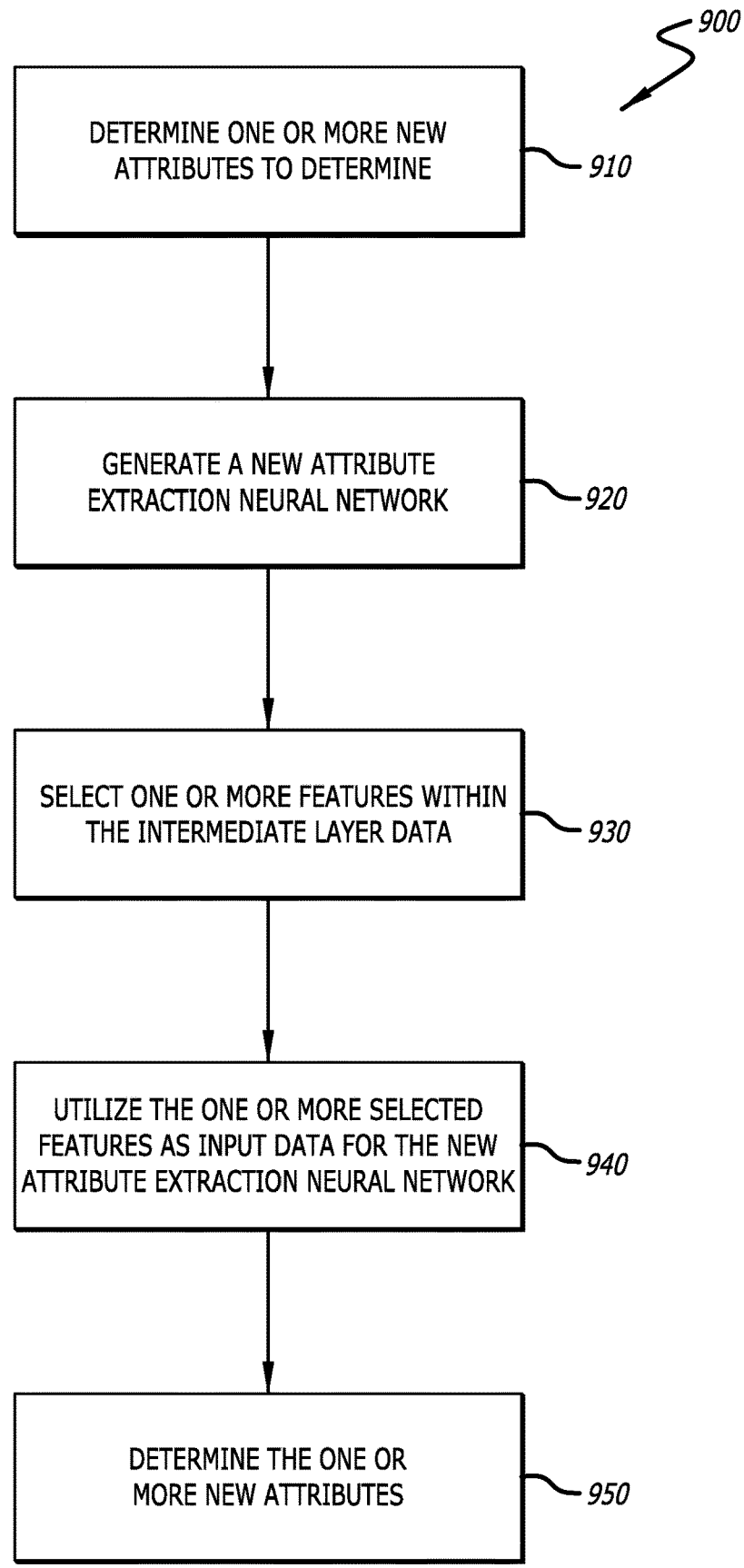
FIG. 9 is a flowchart of a process using a neural network video processing and storage system in accordance with an embodiment of the disclosure.

Referring to FIG. 9, a flowchart of a process 900 for using intermediate layer data to generate and utilize new attribute extraction neural networks in accordance with an embodiment of the disclosure is shown. In many embodiments, the process 900 may begin by determining one or more new attributes to model (block 910). For example, it may be desired to track an attribute like, for example, the color of an identified person's hat. In this example, an attribute model to track this has not previously been developed. Thus, the process 900 may generate and train the new attribute extraction neural network via a model or models with new training data (block 920).

In a variety of embodiments, the newly generate attribute extraction neural network will configured to have one or more features within the intermediate layer data as an input. A selection of which combinations of intermediate layer data to input into the new attribute extraction neural network model can occur (block 930). In additional embodiments, utilizing and processing previously stored intermediate layer data as training data can aid in determining which features from the intermediate layer data should be selected for successful processing of subsequent stored or captured video image data. Once selected, these selected features can be utilized as input data for the new attribute extraction neural network (block 940). Once the new attribute extraction neural network is receiving input data, one or more new attributes can be determined within video image data (block 950).

Information as herein shown and described in detail is fully capable of attaining the presently described embodiments of the present disclosure, and is, thus, representative of the subject matter that is broadly contemplated by the present disclosure. The scope of the present disclosure fully encompasses other embodiments that might become obvious to those skilled in the art, and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, work-piece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device comprising:
   at least one processor configured to, alone or in combination, process video data wherein the processing includes:
      inputting the video data into a primary artificial neural network, wherein:
         the primary artificial neural network comprises at least an input layer, a plurality of intermediate layers, and an output layer;
         the input layer is configured to receive the video data;
         the plurality of intermediate layers comprises a first group of intermediate layers and a second group of intermediate layers;
         the first group of intermediate layers and the second group of intermediate layers include at least one shared intermediate layer;
         a first intermediate layer of the plurality of intermediate layers is configured to pass first intermediate layer data from the first group of intermediate layers to another intermediate layer of the plurality of intermediate layers;
         a second intermediate layer of the plurality of intermediate layers is configured to pass second intermediate layer data from the second group of intermediate layers to another intermediate layer of the plurality of intermediate layers or the output layer; and
         a primary output of the output layer is provided to a metadata generator;
      providing the first intermediate layer data as an input of a first secondary artificial neural network that does not include any layer from the primary artificial neural network, wherein the first secondary artificial neural network is configured to provide a first secondary output to the metadata generator;
      providing the second intermediate layer data as an input of a second secondary artificial neural network that does not include any layer from the primary artificial neural network, wherein the second secondary artificial neural network is configured to provide a second secondary output to the metadata generator; and
      generating, using the metadata generator, a plurality of metadata associated with the video data based on the primary output, the first secondary output, and the second secondary output.

2. The device of claim 1, further comprising:
   a first storage medium having a first storage device type; and
   a second storage medium having a second storage device type, wherein the second storage device type is different from the first storage device type in an access speed of read or write operations.

3. The device of claim 2, wherein:
   the first storage medium is configured to store the received video data; and
   the second storage medium is configured to store the first intermediate layer data and the second intermediate layer data.

4. The device of claim 3, further comprising:
   a storage device comprising:
      the first storage medium; and
      the second storage medium.

5. The device of claim 1, wherein the primary artificial neural network is an object detection neural network.

6. The device of claim 5, wherein the object detection neural network is a convolutional neural network.

7. The device of claim 1, wherein the first secondary artificial neural network comprises at least a recognition neural network.

8. The device of claim 1, wherein:
   a first neural network group comprises a first plurality of secondary artificial neural networks;
   the first plurality of secondary artificial neural networks comprises the first secondary artificial neural network;
   a second neural network group comprises a second plurality of secondary artificial neural networks; and
   the second plurality of secondary artificial neural networks comprises the second secondary artificial neural network.

9. The device of claim 8, wherein the second intermediate layer data is formatted as at least one tensor set of intermediate layer data generated from at least one selection of intermediate layer outputs from the primary artificial neural network.

10. The device of claim 9, wherein;
the second plurality of secondary artificial neural networks comprises a third secondary artificial neural network;
the second secondary artificial neural network is configured to utilize a first tensor set of intermediate layer data from the second intermediate layer data; and
the third secondary artificial neural network is configured to utilize a second tensor set of intermediate layer data from the second intermediate layer data.

11. The device of claim 10, wherein:
the first tensor set of intermediate layer data from the second intermediate layer data is generated from a first group of intermediate layer data outputs from the second group of intermediate layers of the primary artificial neural network; and
the second tensor set of intermediate layer data from the second intermediate layer data is generated from a second group of intermediate layer data outputs from the second group of intermediate layers of the primary artificial neural network.

12. The device of claim 1, wherein a third secondary artificial neural network is selected to generate new metadata after the plurality of metadata has been generated.

13. The device of claim 12, wherein the selected third secondary artificial neural network is configured to utilize intermediate layer data stored within a storage medium.

14. The device of claim 1, wherein the first secondary artificial neural network comprises a tracking neural network.

15. The device of claim 1, wherein the second secondary artificial neural network comprises an attribute neural network.

16. The device of claim 1, wherein:
the first secondary artificial neural network comprises a first attribute neural network for a first attribute; and
the second secondary artificial neural network comprises a second attribute neural network for a second attribute that is different from the first attribute.

17. A method, comprising:
inputting video data into a primary artificial neural network, wherein:
the primary artificial neural network comprises at least an input layer, a plurality of intermediate layers, and an output layer;
the input layer is configured to receive the video data;
the plurality of intermediate layers comprises a first group of intermediate layers and a second group of intermediate layers;
the first group of intermediate layers and the second group of intermediate layers include at least one shared intermediate layer;
a first intermediate layer of the plurality of intermediate layers is configured to pass first intermediate layer data from the first group of intermediate layers to another intermediate layer of the plurality of intermediate layers;
a second intermediate layer of the plurality of intermediate layers is configured to pass second intermediate layer data from the second group of intermediate layers to another intermediate layer of the plurality of intermediate layers or the output layer; and
a primary output of the output layer is provided to a metadata generator;
providing the first intermediate layer data as an input of a first secondary artificial neural network that does not include any layer from the primary artificial neural network, wherein the first secondary artificial neural network is configured to provide a first secondary output to the metadata generator;
providing the second intermediate layer data as an input of a second secondary artificial neural network that does not include any layer from the primary artificial neural network, wherein the second secondary artificial neural network is configured to provide a second secondary output to the metadata generator; and
generating, using the metadata generator, a plurality of metadata associated with the video data based on the primary output, the first secondary output, and the second secondary output.

18. The method of claim 17, further comprising:
defining a target to search within a video data pool comprising a plurality of video data sources and associated intermediate layer data for each video data source;
determining at least one or more features associated with the defined target;
searching for the target within the intermediate layer data associated with the plurality of video data sources, wherein:
the video data pool comprises a plurality of security cameras;
searching of the target comprises utilizing a plurality of secondary artificial neural networks; and
the plurality of secondary artificial neural networks includes at least the second secondary artificial neural network;
locating the target within multiple video data sources; and
determining a path for the defined target.

19. The method of claim 17, wherein the second intermediate layer data is formatted as at least one tensor set of intermediate layer data generated from at least one selection of intermediate layer outputs from the primary artificial neural network.

20. The method of claim 19, wherein:
a first neural network group comprises a first plurality of secondary artificial neural networks;
the first plurality of secondary artificial neural networks comprises the first secondary artificial neural network;
a second neural network group comprises a second plurality of secondary artificial neural networks;
the second plurality of secondary artificial neural networks comprises the second secondary artificial neural network;
the second plurality of secondary artificial neural networks comprises a third secondary artificial neural network;
the second secondary artificial neural network utilizes a first tensor set of intermediate layer data from the second intermediate layer data; and
the third secondary artificial neural network utilizes a second tensor set of intermediate layer data from the second intermediate layer data.

21. The method of claim 20, wherein:
the first tensor set of intermediate layer data from the second intermediate layer data is generated from a first group of intermediate layer data outputs from the second group of intermediate layers of the primary artificial neural network; and the second tensor set of intermediate layer data from the second intermediate layer data is generated from a second group of intermediate layer data outputs from the second group of intermediate layers of the primary artificial neural network.

22. The method of claim 17, further comprising:
selecting, responsive to generating the plurality of metadata, a third secondary artificial neural network; and
generating, using the third secondary artificial neural network, new metadata after the plurality of metadata has been generated.

23. The method of claim 22, wherein the selected third secondary artificial neural network utilizes intermediate layer data stored in a storage medium.

24. The method of claim 17, further comprising:
storing the received video data in a first storage medium; and
storing, responsive to processing by the primary artificial neural network, the first intermediate layer data and the second intermediate layer data in a second storage medium.

25. The method of claim 24, wherein:
the first storage medium has a first storage device type;
the second storage medium has a second storage device type; and
the second storage device type is different from the first storage device type in an access speed of read or write operations.

26. The method of claim 17, wherein the primary artificial neural network is an object detection neural network.

27. The method of claim 17, wherein:
the first secondary artificial neural network comprises an artificial neural network selected from a recognition neural network and a tracking neural network; and
the second secondary artificial neural network comprises an attribute neural network.

28. A device comprising:
at least one processor;
means for inputting video data into a primary artificial neural network, wherein:
the primary artificial neural network comprises at least an input layer, a plurality of intermediate layers, and an output layer;
the input layer is configured to receive the video data;
the plurality of intermediate layers comprises a first group of intermediate layers and a second group of intermediate layers;
the first group of intermediate layers and the second group of intermediate layers include at least one shared intermediate layer;
a first intermediate layer of the plurality of intermediate layers is configured to pass first intermediate layer data from the first group of intermediate layers to another intermediate layer of the plurality of intermediate layers;
a second intermediate layer of the plurality of intermediate layers is configured to pass second intermediate layer data from the second group of intermediate layers to another intermediate layer of the plurality of intermediate layers or the output layer; and
a primary output of the output layer is provided to a metadata generator;
means for providing the first intermediate layer data as an input of a first secondary artificial neural network that does not include any layer from the primary artificial neural network, wherein the first secondary artificial neural network is configured to provide a first secondary output to the metadata generator;
means for providing the second intermediate layer data as an input of a second secondary artificial neural network that does not include any layer from the primary artificial neural network, wherein the second secondary artificial neural network is configured to provide a second secondary output to the metadata generator; and
means for generating, using the metadata generator, a plurality of metadata associated with the video data based on the primary output, the first secondary output, and the second secondary output.

* * * * *